US012784529B2

(12) United States Patent
Jamieson et al.

(10) Patent No.: US 12,784,529 B2
(45) Date of Patent: Nov. 3, 2026

(54) METHOD FOR ENHANCHING EFFICIENCY OF MEDIA REPLENISHMENT IN MEDIA CASSETTES

(71) Applicant: Cardtronics USA, Inc., Atlanta, GA (US)

(72) Inventors: Daniel James Jamieson, Angus (GB); Robin Ian Gregor Angus, Fife (GB); Gareth Charles Sweetland, Dundee (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/093,878

(22) Filed: Mar. 28, 2025

(65) Prior Publication Data

US 2026/0301502 A1 Oct. 1, 2026

(51) Int. Cl.

*G07D 11/30* (2019.01)
*G07D 11/13* (2019.01)
*G07D 11/245* (2019.01)
*G07D 11/25* (2019.01)

(52) U.S. Cl.

CPC ............. *G07D 11/30* (2019.01); *G07D 11/13* (2019.01); *G07D 11/245* (2019.01); *G07D 11/25* (2019.01); *G07D 2211/00* (2013.01)

(58) Field of Classification Search

None

See application file for complete search history.

(56) References Cited

U.S. PATENT DOCUMENTS 11,741,774 B1 * 8/2023 Mande .................. G07D 11/34 235/379
11,900,753 B1 * 2/2024 Mande .................. G07F 19/205
2010/0000708 A1 1/2010 Kotani
2022/0230502 A1 7/2022 Tagashira et al.
2024/0331484 A1 10/2024 Jamieson et al.

FOREIGN PATENT DOCUMENTS

JP 7645644 B2 3/2025

OTHER PUBLICATIONS

European Search report for European Application No. EP 26 16 3306, Completed on Jul. 13, 2026.

* cited by examiner

*Primary Examiner* — Thien M Le
*Assistant Examiner* — April A Taylor
(74) *Attorney, Agent, or Firm* — Notaro, Michalos & Zaccaria P.C.; John S. Economou

(57) ABSTRACT

A determination is made that a current first media level in a first media cassette is above a forecast first media level and that a current second media level in a second media cassettes is below a forecast second media level. The terminal moves an amount of first media from the first media cassette equal to a difference between the current first media level and the forecast first media level to a third media cassette containing a third media, which is then removed, emptied of all media, an amount of third media is added equal to a forecast third media level, an amount of second media is added equal to a difference between the current second media level and the forecast second media level, and the third media cassette is reinstalled into the terminal. The second media in the third media cassette is then moved to the second media cassette.

20 Claims, 3 Drawing Sheets

METHOD FOR ENHANCING EFFICIENCY OF MEDIA REPLENISHMENT IN MEDIA CASSETTES

FIELD

The present disclosure relates to methods for enhancing the efficiency of media replenishment in media cassettes based on media level forecasts, and in particular, to methods which use one of a plurality of media cassettes to first pre-stage media to be removed from the plurality of media cassettes and then to temporarily hold replenishment media for the others of the plurality of media cassettes.

BACKGROUND

Currently, to obtain a proper level of currency denominations held in cassettes of media terminals, such as automated teller machines (ATMs), manual service visits to the ATM are required by cash service personnel or retail staff. These physical interventions require scheduling and planning by the ATM operators and bring the ATMs offline and unavailable for customer transactions, which is costly to the operators.

A recycler is a type of ATM that can accept and process cash deposits, and then automatically recycle (i.e., re-use) that cash for withdrawals by other customers. Typically, a recycler includes a separate cassette for each denomination of currency. Recyclers can, at least partially, alleviate the frequency of cash service visits. However, each ATM is associated with different customers from different geographical areas and/or cultures. That is, each ATM has its own media profile (i.e., currency level per cassette) associated with cash deposits and withdrawals from the customers at the corresponding ATM. Each ATM also has a maintained configuration for denominations recycled by its recycler. ATM operators often settle on the ATM's denomination configuration when a recycler is first installed within their ATM and never change the denominations thereafter. The problem with this is that customer demographics, economic conditions, and cash behaviors are dynamic and change over time. Thus, the recycler begins to experience more frequent media service visits over time as the media profile changes, with resulting offline periods.

This need for regular access by personnel can be problematic because of the costs associated with cash service visits and because the ATMs are offline for substantial periods of time during pre-staging, replenishment or deposit pull activities. Thus, from the point of view of the ATM operators, it is desirable to minimize the frequency of such events and to reduce the time required at site. There is thus a need for an improved method of preparing the cash for such activities to reduce the above problems by reducing both offline time and the expenses for service visits.

There is thus a need for a method of pre-staging currency levels of cassettes in a recycler which overcomes the above problems by reducing both offline time and the expenses for service visits.

SUMMARY

In a general aspect, the disclosed method may include determining, by the terminal, that a current first media level in a first one of the plurality of media cassettes is above a forecasted first media level for that first media cassette. The method may also include determining, by the terminal, that a current second media level in a second one of the plurality of media cassettes is below a forecasted second media level for that second media cassette. Furthermore, the method may include moving, by the terminal, an amount of first media from the first one of the plurality of media cassettes equal to the difference between the current first media level in that first media cassette and the forecasted first media level for that first media cassette to a third media cassette among the plurality of cassettes, with the third media cassette containing a third media. Additionally, the method may include removing the third media cassette from the terminal, emptying all media from the third media cassette, adding an amount of third media to the third media cassette equal to a forecasted third media level for the third media cassette, adding an amount of second media to the third media cassette equal to the difference between the current second media level in the second one of the plurality of media cassettes and the forecasted second media level for that second media cassette, and reinstalling the third media cassette into the terminal. Moreover, the method may include moving, by the terminal, the second media in the third media cassette to the second one of the plurality of media cassettes. Other embodiments of the present disclosure include corresponding computer systems, apparatus, and computer programs recorded on one or more computer storage devices, each configured to perform the actions of the methods.

Implementations may include one or more of the following features: a method where the media comprises banknotes, a method where the second media comprises a second denomination of banknotes, and a method where the third media comprises a third denomination of banknotes.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
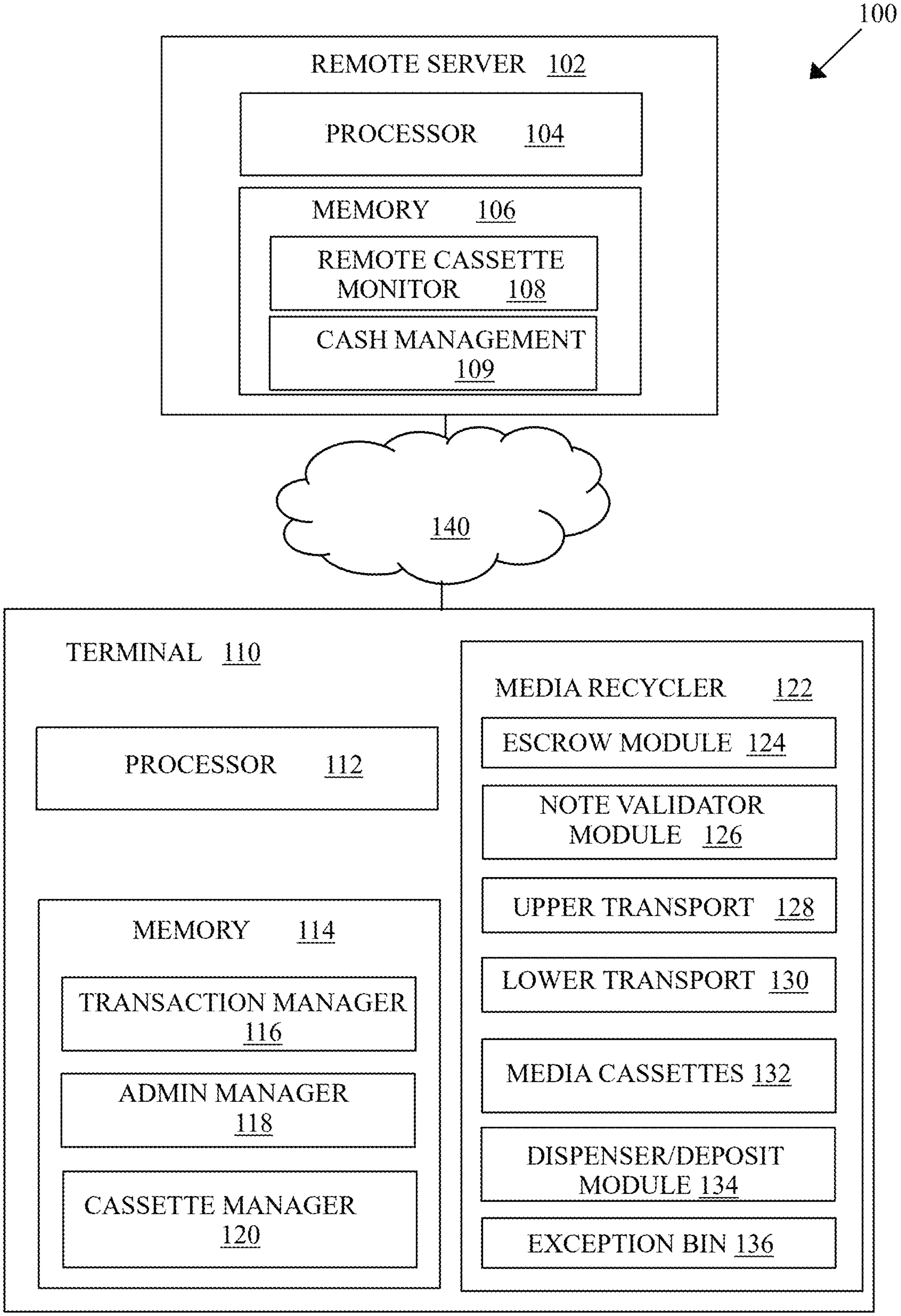
FIG. 1 is a block diagram of a system including a terminal implementing the method for adjusting media levels in media cassettes according to the present disclosure.

FIG. 1 is a diagram of a system 100 which includes a terminal 110 having a media recycler 122 configured for adjusting media levels according to an example embodiment. The terminal may be, for example, an automated teller machine, a self-service terminal, or a point-of-sale terminal. It is to be noted that the components are shown schematically in greatly simplified form, with only those components relevant to understanding of the embodiments being illustrated. Furthermore, the various components (that are identified in FIG. 1) are illustrated and the arrangement of the components is presented for purposes of illustration only.

System 100 includes one or more transaction terminals (hereinafter "terminals") 110 that each may be coupled to a remote server 102 via a network 140. Network 140 may be a private wide area network or a public wide area network with communications between the remote server 102 and the terminal 110 encrypted as known in the art. Terminal 110 includes a processor 112 and a memory 114. Memory 114 is a non-transitory computer-readable storage medium. Memory 114 includes, inter alia, executable instructions for a transaction manager 116, an admin manager 118, and a cassette manager 120. Processor 112 is configured to selectively execute the executable instructions from memory 114 in order to perform the operations discussed herein with respect to the transaction manager 116, the admin manager 118, and the cassette manager 120. Each terminal 110 further includes a media recycler 122 having an escrow module 124, a note validator module 126, an upper transport 128, a lower transport 130, a plurality of media cassettes 132, a dispenser/deposit module 134, and an exception bin 136.

The network 140 permits transaction manager 116 and/or admin manager 118 to communicate over a secure connection with the remote server 102 and with other computers coupled to network 140 in order to support the normal operation of terminal 110. The remote server 102 includes a processor 104 and a memory 106. Memory 106 is a non-transitory computer-readable storage medium. Memory 106 includes, inter alia, executable instructions for a remote cassette monitor 108 and a cash management module 109. Processor 104 is configured to selectively execute the executable instructions from memory 106 in order to perform the operations discussed herein with respect to the remote cassette monitor 108 and the cash management module 109. The cassette monitor 108 keeps track of status information for all of the media cassettes 132 and provide such information to the cash management module 109. The cash management module 109 provides forecast information for each cassette among the plurality of media cassettes 132 in each terminal 110, provides instructions (e.g., to staff associated with terminal 110) on when replenishment/bank note pull is necessary, and may remotely signal the terminal 110 to perform the pre-staging bank note movement described herein.

The escrow module 124 in the media recycler 122 temporarily stores bank notes being processed through the media recycler 122 as a transaction is processed. The upper transport 128 is a mechanism that transports bank notes either to the lower transport 130 for bank notes being deposited or out through the dispenser/deposit module 134 for bank notes being withdrawn from the media recycler 122. The lower transport 130 is a mechanism that transfers bank notes received from the upper transport 128 into a corresponding one of the media cassettes 132 based on information (i.e., the denomination of the note) from the note validator module 126. Lower transport 130 also transfers bank notes out of one or more of the media cassettes 132 to the upper transport 128 when the bank notes are to be dispensed through the dispenser/deposit module 134. The note validator module 126 processes each note and provides information about such note, including at least an indication as to the denomination of each note and may also provide an indication whether or not the note is fit for circulation (e.g., torn, dirty, ripped, or damaged bank notes are indicated as being not fit for circulation) and an indication whether the given note is genuine or counterfeit. The information from the note validator module 126 is provided to the lower transport 130 to identify which of the media cassettes 132 is to be used to store a given deposited note.

During currency deposits and withdrawals, transaction manager 116 controls the operation of the media recycler 122. During a withdrawal when $100 in bank notes is to be dispensed to a customer during a withdrawal, transaction manager 116 provides commands causing the lower transport 130 to obtain five $20 denomination bank notes from the corresponding one of media cassettes 132 designated to store such bank notes and then to provide those bank notes to the upper transport 128. The transaction manager 116 then causes upper transport 128 to divert the five $20 bank notes to the note validator module 126, which processes each note and forwards each note back to the upper transport 128. The transaction manager 116 then causes the upper transport 128 to forward the five $20 bank notes to the dispenser/deposit module 134 so that the customer can retrieve them. During a deposit, transaction manager 116 instructs the dispenser/deposit module 134 to forward deposited bank notes via the upper transport 128 to the note validator module 126. Under the control of the transaction manager 116, the note validator module 126 processes the deposited bank notes and then forwards the bank notes to the escrow module 124 and provides identifying the denomination and condition of each of the deposited bank notes. The deposited bank notes remain in the escrow module 124 until the customer confirms that the deposit should be completed. Upon such confirmation, the transaction manager 116 causes the bank notes to be transferred out of the escrow module 124, routed back through the note validator module 126, then to the upper transport 128, to the lower transport 130, and then into an appropriate one of the media cassettes 132 for the denomination of each of the bank notes.

Figure 2:
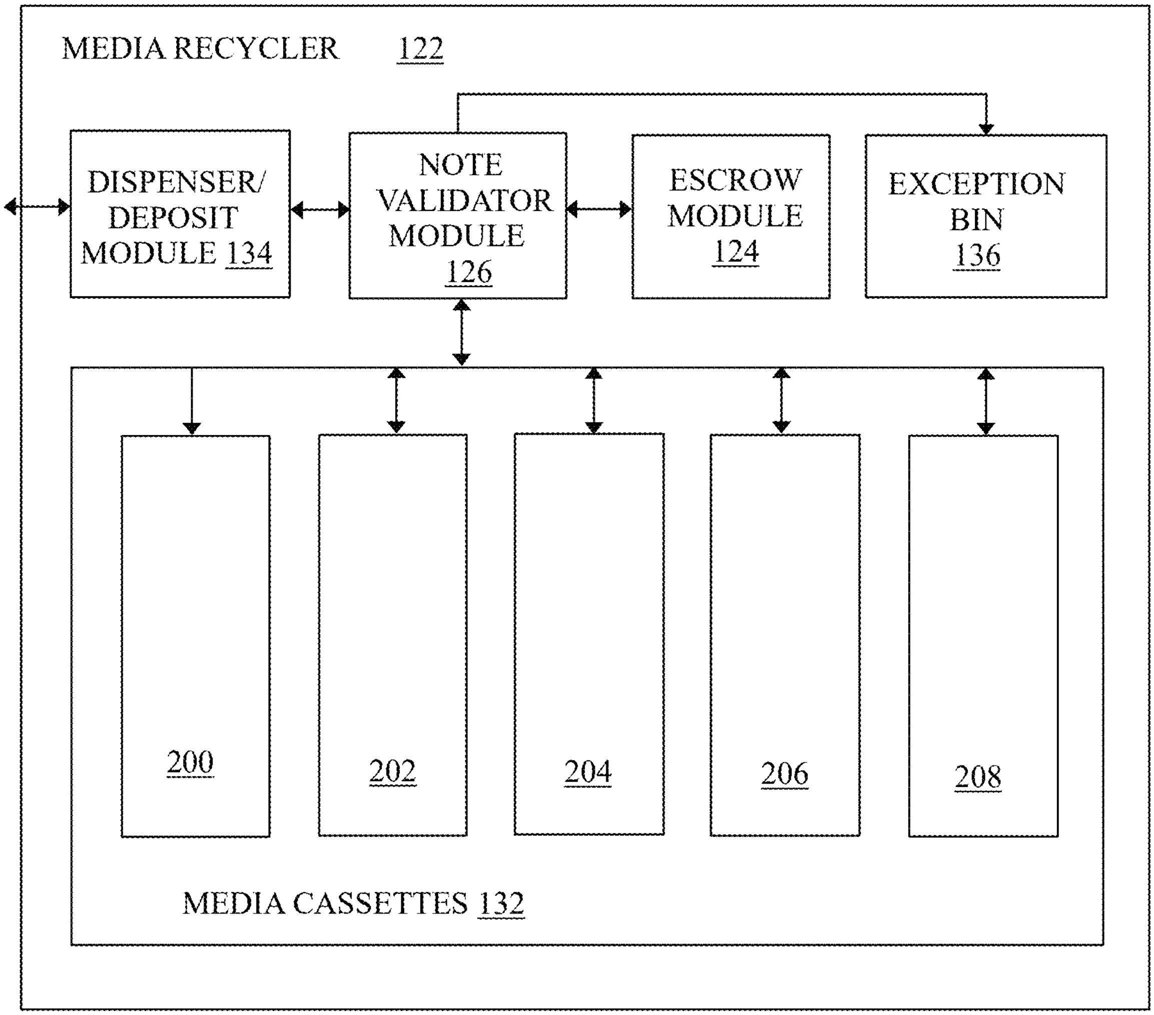
FIG. 2 is a simplified block diagram of the media recycler in the terminal shown in FIG. 1.

Referring now to FIG. 2, a simplified version of the media recycler 122 is shown that omits the upper transport 128 and lower transport 130 and shows each separate media cassette among the media cassettes 132. A separate media cassette is provided for each denomination of bank note. In the embodiment shown in FIG. 2, media cassette 202 is designated to store $10 bank notes, media cassette 204 is designated to store $20 bank notes, media cassette 206 is designated to store $50 bank notes, and media cassette 208 is designated to store $100 bank notes. An additional storage cassette (i.e., "all-in" cassette 200) is provided to store bank notes that are unfit for circulation (e.g., bank notes that are torn, dirty, ripped, or otherwise damaged). The all-in cassette 200 also stores deposited genuine and fit bank notes that are of denominations for which there is no corresponding cassette (e.g., a $1, $2 or $5 bank notes in the embodiment shown in FIG. 2). In the manner, it is evident that the bank notes stored in the all-in cassette 200 are not organized by denomination. The all-in cassette 200 only stores genuine bank notes, any counterfeit detected bank notes are moved to and stored in exception bin 136.

The admin manager 118 provides an administrative interface through which service personnel designate each of the media cassettes 132 as being associated with specific note denominations and/or designated as the all-in cassette 200. During use of terminal 110 in accepting bank note depositions and providing bank note withdrawals, the admin manager 118 maintains a count per denomination present in each of media cassettes 132 designated to hold separate denominations (i.e., media cassettes 202, 204, 206, 208 in FIG. 1) as the media recycler 122 of terminal 110. The admin manager 118 also maintains information about the denomination designated for each of the media cassettes 132 and a cassette identifier for the all-in cassette 200. Admin manager 118 is configured to provide these metrics and other metrics in real time to the cassette manager 120 and to the remote cassette monitor 108. Admin manager 118 may also provide such metrics in real time to service personnel through a service interface. At any given point in time, an operator associated with a given terminal 110 can obtain, either locally or remotely, cassette identifiers for each of the media cassettes 132 designated to store separate denominations of bank notes, the known bank note capacity for each of the media cassettes 132, the denomination of bank notes stored for each of the media cassettes 132, a total number of bank notes currently stored in for each of the media cassettes 132, and a cassette identifier for the all-in cassette 200 among the media cassettes 132.

The method of the present disclosure relies on bank note forecast information for the number of bank notes needed for each denomination. Each media cassette 202, 204, 206, 208 has a designated denomination and a designated forecast for the number of bank notes required (for demand at the location of the terminal 110) for that denomination. Previously, when it was determined that one or more of the media cassettes 202, 204, 206, 208 require replenishment because the number of bank notes therein fall below the forecasted required number of bank notes, the terminal 110 would be taken out of service, each cassette requiring replenishment would be removed and taken to the bank vault for replenishment, and then the cassettes would be returned to the terminal 110. This process requires a significant amount of time in which the terminal 110 is out of service. In order to overcome this significant time delay, under the control of the cassette manager 120, the method of the present disclosure identifies and then designates one of the media cassettes 202, 204, 206, 208 (i.e., the media cassettes which hold separate denominations of bank notes) as an operation cassette that is used to convey all excess bank notes out of terminal 110, as explained with respect to FIGS. 2 and 3, effectively pre-staging movement of the excess bank notes and allowing the terminal to remain in services.

Figure 3:
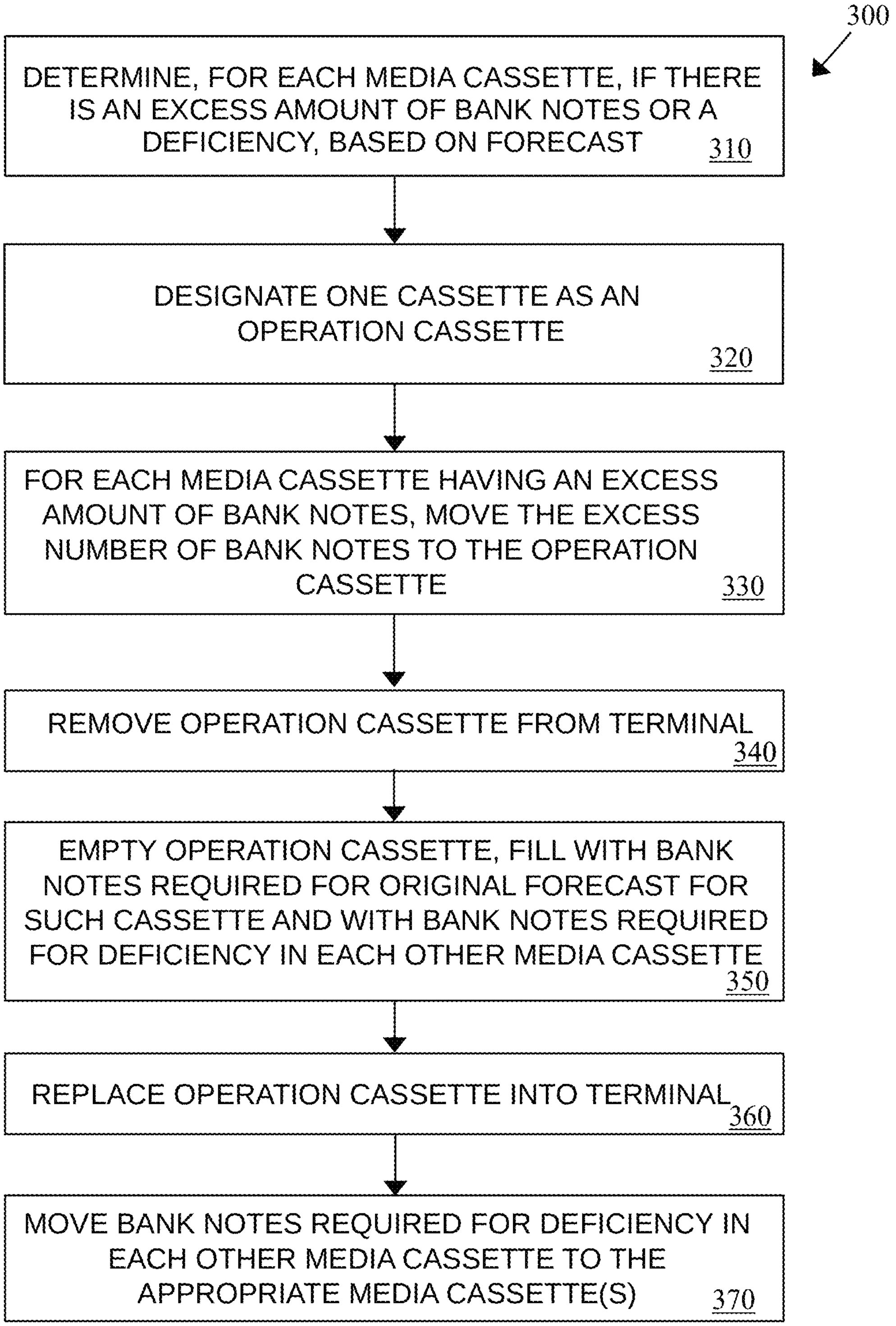
FIG. 3 is flow chart of the methods for adjusting media levels in media cassettes according to the present disclosure.

Referring now to the flowchart 300 in FIG. 3, in a first step 310, it is determined if each of the media cassettes 132 which hold separate denominations has an excess or deficiency in the amount of bank notes therein, based on the forecasted amounts for terminal 110. This can be performed locally by admin manager 118 or remotely by cash management module 109. An example of the determination is shown in Table 1 below:

TABLE 1

| Step 310 | | | | |
|---|---|---|---|---|
| | Media Cassette | | | |
| | 202 | 204 | 206 | 208 |
| Designated Denomination | $10 | $20 | $50 | $100 |
| Forecast | 400 | 1000 | 2000 | 1100 |
| Current Count | 200 | 1500 | 1000 | 1300 |
| Net | (200) | 500 | (1000) | 200 |

As evident from Table 1, after step 310, it has been determined that media cassettes 202 and 206 each have a deficiency in the number of bank notes therein, while media cassettes 204 and 208 have an excess number of bank notes.

Next, at step 320, one of the media cassettes 202, 204, 206, 208 is designated, e.g., by cassette manager 120, as an operation cassette. This determination may be made based on a comparison of the bank note levels versus the bank note forecast of each cassette or may be pre-defined. Typically, a media cassette with a deficiency in the number of bank notes therein may be selected. For the working example here, media cassette 202 is designated as the operation cassette.

Once the operation cassette is designated, at step 330, terminal 110 is put off-line and the cassette manager 120 causes the lower transport 130 and the upper transport 128 to move the excess bank notes from the media cassettes having an excess of bank notes (here media cassettes 204, 208) to the operation cassette (i.e., media cassette 202). To ensure accuracy, the cassette manager 120 controls the lower transport 130 and the upper transport 128 to move the bank notes from the originating media cassette 204, 208 to the note validator module 126, to the escrow module 124, and then to the operation cassette (i.e., media cassette 202). The bank notes may be moved in predetermined batches from each media cassette, e.g., 300 at a time. Once this process is completed for each other media cassette as necessary, there will be a change in the number of bank notes in each media cassette, as shown in Table 2 below (as maintained by the admin manager 118):

TABLE 2

| Step 320 | | | | |
|---|---|---|---|---|
| | Media Cassette | | | |
| | 202 | 204 | 206 | 208 |
| Designated Denomination | $10 $20 $100 | $20 | $50 | $100 |
| Forecast | 400 | 1000 | 2000 | 1100 |
| Current Count | 200 500 200 | 1000 | 1000 | 1100 |
| Net | n/a | 0 | (1000) | 0 |

Once step 330 is completed, the terminal 110 may be put back online, with only the denomination of media cassette 202 not available.

At step 340, at a time convenient to local operators, the operation cassette (i.e., media cassette 202) is removed from the media recycler 122 (with terminal 110 set offline). The operation cassette is then, at step 350, taken to a secure area, emptied, and replenished with the necessary bank notes, both for the denomination requirements for the media cassette 202 and for any other media cassette having a deficiency (i.e., media cassette 206 in the example shown here). The all-in cassette 200 is typically emptied at this point as well. In some cases, a replacement cassette for the operation cassette may be prepared in advance, preferably with an empty replacement cassette for the all-in cassette 200, to further reduce the time in which the terminal 110 is offline. The replenished (or replacement) operation cassette is then replaced into the terminal at step 360. At this point, a disclosed count of the media cassettes will be as shown in Table 3 (as maintained by the admin manager 118):

TABLE 3

| Step 360 | | | | |
|---|---|---|---|---|
| | Media Cassette | | | |
| | 202 | 204 | 206 | 208 |
| Designated Denomination | $10 $50 | $20 | $50 | $100 |
| Forecast | 400 | 1000 | 2000 | 1100 |
| Current Count | 400 1000 | 1000 | 1000 | 1100 |
| Net | n/a | 0 | (1000) | 0 |

Finally, at step 370, the cassette manager 120 causes the lower transport 130 and the upper transport 128 to move the bank notes for the media cassette(s) having a deficiency of bank notes (here media cassette 206) from the operation cassette (i.e., media cassette 202) to the appropriate media cassette. To ensure accuracy, the cassette manager 120 controls the lower transport 130 and the upper transport 128 to move the bank notes from the operation cassette (i.e., media cassette 202) to the note validator module 126, to the escrow module 124, and then to the appropriate cassette (here only media cassette 206). The bank notes may be moved in predetermined batches, e.g., 300 at a time. Once this process is completed for each other media cassette as necessary and all of the bank notes are in their designated final destination (media cassette), a count for each denomination of bank notes from the operation cassette is added to the prior known counts, so that the terminal 110 can perform a host settlement—effectively updating the internal status of each of the media cassettes 132. The terminal 110 is then placed back on-line, with the change in the number of bank notes in each media cassette shown in Table 4 below:

TABLE 4

| Step 370 | | | | |
|---|---|---|---|---|
| | Media Cassette | | | |
| | 202 | 204 | 206 | 208 |
| Designated Denomination | $10 | $20 | $50 | $100 |
| Forecast | 400 | 1000 | 2000 | 1100 |
| Current Count | 400 | 1000 | 2000 | 1100 |
| Net | 0 | 0 | 0 | 0 |

In a further embodiment, the bank note replenishment may not be from an associated vault, but instead by movement of bank notes between terminals. The demand required by a second terminal is given to a first terminal so that the first terminal can satisfy the bank note demand for the second terminal. The first terminal pre-stages bank notes into the operation cassette to satisfy the need of the second terminal. The process is similar to that shown in the flowchart 300 of FIG. 3, except that the bank note pre-staging is based on the second terminal requirements and then the pre-staged operation cassette is moved from the first terminal to the second terminal. The cassette is placed into the destination ATM and the bank notes moved to the target cassettes instead. This embodiment allows for the cross-movement of bank notes between terminals.

In all cases, the admin manager 118 maintains a record of which of the media cassettes have been unseated from the terminal 110. This permits the level of those other media cassettes which have not been unseated to be maintained, which in conjunction with the audit record from the audit record from the terminal operator's safe access process, e.g., electronic lock access records, allows the terminal operator to be able to maintain sufficient visibility and confidence of the cash levels of the terminal from a risk management perspective. In particular, additional trust in the cassette balance is provided because the removal of each cassette is logged and thus the terminal operator can be confident that no cash was taken from cassettes not removed.

The present disclosure provides a number of advantages over prior solutions. The present disclosures provides for a dynamic operation cassette which is a selected one of the recycle cassettes that is converted to an operation cassette at the point that pre-staging or replenishment is required and then returned to a recycle cassette at a point after replenishment is completed. The operation cassette may be selected utilizing the cash forecast and cash counts of each recycling cassette. Excess bank notes from recycle cassettes may be pre-staged into the operation cassette, utilizing a remotely or locally executed command, so the bank notes to be removed from the terminal is pre-positioned in advance. The operation cassette maybe be placed within a recycler and once secured the replenishment cash may be moved to destination recycle cassettes.

The present disclosure provides for more efficient replenishment of a recycler in a terminal by allowing the recyclable bank notes to be left inside of the terminal (in the operation cassette) between replenishment periods and provides for an auditable method to remove excess bank notes without impacting other recycle cassettes. The method of the present disclosure provides increased efficiency without requiring hardware changes in the terminal, without leaving an empty cassette, and without increasing the product footprint as would other solutions requiring hardware changes. The method of the present disclosure permits the terminal to stay in service (online) for the longest possible period prior to requiring manual intervention because it allows operation after pre-staging of the operation cassette.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A method for adjusting media levels in a plurality of media cassettes in a terminal, comprising:

determining that a current first media level of a first media in a first media cassette of the plurality of media cassettes is above a forecast first media level for the first media cassette of the plurality of media cassettes;

determining, by the terminal, that a current second media level of a second media in a second media cassette of the plurality of media cassettes is below a forecast second media level for the second media cassette of the plurality of media cassettes; and moving, by the terminal, an amount of the first media from the first media cassette of the plurality of media cassettes equal to a difference between the current first media level in the first media cassette of the plurality of media cassettes and the forecast first media level for the first media cassette of the plurality of media cassettes to a third media cassette among the plurality of media cassettes, the third media cassette different from the first media cassette and the second media cassette and containing a third media.

2. The method of claim 1, further comprising:

removing the third media cassette from the terminal, emptying all media from the third media cassette, adding an amount of third media to the third media cassette equal to a forecast third media level for the third media cassette, adding an amount of second media to the third media cassette equal to a difference between the current second media level in the second media cassette of the plurality of media cassettes and the forecast second media level for the second media cassette of the plurality of media cassettes, and reinstalling the third media cassette into the terminal; and moving, by the terminal, the second media in the third media cassette to the second media cassette of the plurality of media cassettes.

3. The method of claim 1, wherein the step of determining that the current first media level in the first media cassette of the plurality of media cassettes is above a forecast first media level for the first media cassette of the plurality of media cassettes is performed locally by the terminal.

4. The method of claim 1, wherein the step of determining that the current first media level in the first media cassette of the plurality of media cassettes is above the forecast first media level for the first media cassette of the plurality of media cassettes is performed by a cash management module on a remote server.

5. The method of claim 1, wherein the media comprises bank notes, wherein the first media comprises a first denomination of bank notes, and wherein the second media comprises a second denomination of bank notes.

6. The method of claim 1, wherein the terminal is an automated teller machine, a self-service terminal, or a point-of-sale terminal.

7. The method of claim 1, further comprising:

determining, by the terminal, that a current level of a fourth media in a fourth media cassette of the plurality of media cassettes is above a forecast level for the fourth media cassette of the plurality of media cassettes; and moving, by the terminal, an amount of the fourth media from the fourth media cassette of the plurality of media cassettes equal to a difference between the current level of the fourth media in the fourth media cassette of the plurality of media cassettes and the forecast level for the fourth media cassette of the plurality of media cassettes to the third media cassette.

8. The method of claim 7, wherein the fourth media comprises a fourth denomination of bank notes.

9. The method of claim 1, further comprising:

determining, by the terminal, that a current level of a fourth media in a fourth media cassette of the plurality of media cassettes is below a forecast level for the fourth media cassette of the plurality of media cassettes;

adding an amount of the fourth media to the third media cassette equal to a difference between the current level of the fourth media in the fourth media cassette of the plurality of media cassettes and the forecast level for the fourth media cassette of the plurality of media cassettes before reinstalling the third media cassette into the terminal; and moving, by the terminal, the fourth media in the third media cassette to the fourth media cassette of the plurality of media cassettes.

10. The method of claim 9, wherein the fourth media comprises a fourth denomination of bank notes.

11. A terminal, comprising:

a processor;

a plurality of media cassettes for holding media;

a non-transitory computer readable storage medium comprising executable instructions that cause the processor to perform operations comprising:

determining that a current first media level in a first media cassette of the plurality of media cassettes is above a forecast first media level for the first media cassette of the plurality of media cassettes;

determining that a current second media level in a second media cassette of the plurality of media cassettes is below a forecast second media level for the second media cassette of the plurality of media cassettes;

moving an amount of first media from the first media cassette of the plurality of media cassettes equal to a difference between the current first media level in the first media cassette of the plurality of media cassettes and the forecast first media level for the first media cassette of the plurality of media cassettes to a third media cassette among the plurality of media cassettes, the third media cassette containing a third media; and after the third media cassette being removed from the terminal, emptied of all media from the third media cassette, having an amount of third media added to the third media cassette equal to a forecast third media level for the third media cassette, an amount of second media added to the third media cassette equal to a difference between the current second media level in the second media cassette of the plurality of media cassettes and the forecast second media level for the second media cassette of the plurality of media cassettes, and the third media cassette reinstalled into the terminal, moving the second media in the third media cassette to the second media cassette of the plurality of media cassettes.

12. The terminal of claim 11, wherein the media comprises bank notes, and wherein the first media comprises a first denomination of bank notes.

13. The terminal of claim 12, wherein the second media comprises a second denomination of bank notes.

14. The terminal of claim 13, wherein the third media comprises a third denomination of bank notes.

15. The terminal of claim 11, wherein the terminal is an automated teller machine, a self-service terminal, or a point-of-sale terminal.

16. The terminal of claim 11, wherein the non-transitory computer readable storage medium further comprising executable instructions that cause the processor to perform operations comprising:

determining that a current fourth media level in a fourth media cassette of the plurality of media cassettes is above a forecast fourth media level for the fourth media cassette of the plurality of media cassettes; and moving an amount of fourth media from the fourth media cassette of the plurality of media cassettes equal to a difference between the current fourth media level in the fourth media cassette of the plurality of media cassettes and the forecast fourth media level for the fourth media cassette of the plurality of media cassettes to the third media cassette.

17. The terminal of claim 16, wherein the fourth media comprises a fourth denomination of bank notes.

18. The terminal of claim 11, wherein the non-transitory computer readable storage medium further comprising executable instructions that cause the processor to perform operations comprising:

determining, by the terminal, that a current fourth media level in a fourth media cassette of the plurality of media cassettes is below a forecast fourth media level for the fourth media cassette of the plurality of media cassettes; and after an amount of the fourth media being added to the third media cassette equal to a difference between the current fourth media level in the fourth media cassette of the plurality of media cassettes and the forecast fourth media level for the fourth media cassette of the plurality of media cassettes before reinstalling the third media cassette into the terminal, moving the fourth media in the third media cassette to the fourth media cassette of the plurality of media cassettes.

19. The terminal of claim 18, wherein the fourth media comprises a fourth denomination of bank notes.

20. A terminal, comprising:

a processor;

a plurality of media cassettes for holding media;

a non-transitory computer readable storage medium comprising executable instructions that cause the processor to perform operations comprising:

receiving an indication from a cash management module on a remote server that a current first media level in a first media cassette of the plurality of media cassettes is above a forecast first media level for the first media cassette of the plurality of media cassettes;

determining that a current second media level in a second media cassette of the plurality of media cassettes is below a forecast second media level for the second media cassette of the plurality of media cassettes;

moving an amount of first media from the first media cassette of the plurality of media cassettes equal to a difference between the current first media level in the first media cassette of the plurality of media cassettes and the forecast first media level for the first media cassette of the plurality of media cassettes to a third media cassette among the plurality of media cassettes, the third media cassette containing a third media; and after the third media cassette being removed from the terminal, emptied of all media from the third media cassette, having an amount of third media added to the third media cassette equal to a forecast third media level for the third media cassette, an amount of second media added to the third media cassette equal to a difference between the current second media level in the second media cassette of the plurality of media cassettes and the forecast second media level for the second media cassette of the plurality of media cassettes, and the third media cassette reinstalled into the terminal, moving the second media in the third media cassette to the second media cassette of the plurality of media cassettes.

* * * * *